US009062570B2

(12) United States Patent
Buse et al.

(10) Patent No.: US 9,062,570 B2
(45) Date of Patent: Jun. 23, 2015

(54) INFINITELY VARIABLE PRESSURE-CONTROL VALVE

(75) Inventors: Werner Buse, Kaarst (DE); Franz-Josef Schnelker, Neuss (DE); Rolf Dohrmann, Kaarst (DE); Christoph Sadowski, Bochum (DE)

(73) Assignee: PIERBURG GMBH, Neuss (DE)

( * ) Notice: Subject to any disclaimer, the term of this patent is extended or adjusted under 35 U.S.C. 154(b) by 294 days.

(21) Appl. No.: 13/805,668

(22) PCT Filed: May 24, 2011

(86) PCT No.: PCT/EP2011/058410
§ 371 (c)(1),
(2), (4) Date: Dec. 20, 2012

(87) PCT Pub. No.: WO2011/160910
PCT Pub. Date: Dec. 29, 2011

(65) Prior Publication Data
US 2013/0112293 A1 May 9, 2013

(30) Foreign Application Priority Data
Jun. 25, 2010 (DE) .......................... 10 2010 025 175

(51) Int. Cl.
*F16K 31/02* (2006.01)
*F16K 31/122* (2006.01)
*F01L 9/02* (2006.01)
*G05D 16/20* (2006.01)
*F04C 14/22* (2006.01)

(52) U.S. Cl.
CPC ............. *F01L 9/02* (2013.01); *G05D 16/2093* (2013.01); *Y10T 137/7793* (2015.04); *G05D 16/2013* (2013.01); *F04C 14/223* (2013.01)

(58) Field of Classification Search
CPC ............................. F01L 9/02; G05D 16/2093
USPC ........... 60/445, 452; 251/129.07, 129.18, 282
See application file for complete search history.

(56) References Cited

U.S. PATENT DOCUMENTS

| 3,322,342 | A | * | 5/1967 | Veale | .......................... 236/12.12 |
| 4,072,443 | A | * | 2/1978 | Heath | ............................ 417/218 |
| 4,247,052 | A | * | 1/1981 | Gray | ........................... 239/585.2 |
| 4,250,922 | A | * | 2/1981 | Will et al. | ................. 137/625.65 |
| 4,399,886 | A | * | 8/1983 | Pollman | ........................ 180/197 |

(Continued)

FOREIGN PATENT DOCUMENTS

| DE | 94 10 219 U1 | 12/1994 |
| DE | 44 02 523 A1 | 8/1995 |

(Continued)

*Primary Examiner* — Marina Tietjen
*Assistant Examiner* — Seth W Mackay-Smith
(74) *Attorney, Agent, or Firm* — Norman B. Thot

(57) ABSTRACT

A pressure-control valve includes a housing, a coil carrier, a coil wound on the coil carrier, a first bearing, an armature comprising a valve member. The armature is configured to be axially displaced in the first bearing. A core. A flux guiding device. A connection sleeve comprises a valve seat for the valve member. A first connection bore is configured to be connected with a tank and with the connection sleeve. A second connection bore is configured to be connected with a consumer. An end of the connection sleeve distant from the core comprises a control bore with a control member supported therein. The armature and the control member are configured to be in a force-transmitting operative connection at least in an opening direction of the pressure-control valve.

15 Claims, 1 Drawing Sheet

(56) References Cited

U.S. PATENT DOCUMENTS

| | | | | |
|---|---|---|---|---|
| 4,579,145 | A | * | 4/1986 | Leiber et al. ............ 137/625.65 |
| 4,598,736 | A | * | 7/1986 | Chorkey ................. 137/625.65 |
| 4,632,358 | A | * | 12/1986 | Orth et al. ..................... 251/117 |
| 4,669,504 | A | * | 6/1987 | Fujitsugu et al. ........ 137/625.65 |
| 4,693,081 | A | * | 9/1987 | Nakamura et al. ............. 60/448 |
| 4,744,389 | A | * | 5/1988 | Ichihashi ................ 137/625.65 |
| 4,771,984 | A | * | 9/1988 | Szablewski et al. ..... 251/129.15 |
| 4,883,252 | A | * | 11/1989 | Mesenich ................ 251/129.18 |
| 4,900,167 | A | | 2/1990 | Kaufmann |
| 4,947,893 | A | * | 8/1990 | Miller et al. ............ 137/625.65 |
| 5,000,420 | A | * | 3/1991 | Hendrixon et al. ...... 251/129.08 |
| 5,312,050 | A | * | 5/1994 | Schumann et al. ........ 239/585.1 |
| 5,513,832 | A | * | 5/1996 | Becker et al. ........... 251/129.18 |
| 5,785,299 | A | * | 7/1998 | Katsuta et al. ........... 251/129.18 |
| 6,161,813 | A | * | 12/2000 | Baumgartner et al. ......... 251/50 |
| 6,397,891 | B1 | * | 6/2002 | Neuhaus et al. ......... 137/625.65 |
| 6,556,113 | B2 | | 4/2003 | Ketschau et al. ............. 335/220 |
| 6,612,544 | B2 | * | 9/2003 | Sakata et al. ............. 251/129.15 |
| 6,918,409 | B1 | | 7/2005 | Parker |
| 7,195,027 | B2 | * | 3/2007 | Goossens et al. .......... 137/15.18 |
| 7,497,232 | B2 | * | 3/2009 | Muller et al. ............ 137/625.26 |
| 7,503,754 | B2 | * | 3/2009 | Okii et al. .................. 417/222.2 |
| 2006/0016492 | A1 | | 1/2006 | Muller et al. |
| 2007/0181840 | A1 | | 8/2007 | Mitsumata et al. |
| 2009/0179164 | A1 | | 7/2009 | Higashidozono et al. |

FOREIGN PATENT DOCUMENTS

| | | | |
|---|---|---|---|
| DE | 195 10 647 | C1 | 2/1996 |
| DE | 44 02 523 | C2 | 7/1997 |
| DE | 10104622 | A1 * | 8/2002 |
| DE | 10 2004 020 268 | A1 | 11/2005 |
| DE | 10 2008 041 219 | A1 | 2/2010 |
| EP | 0 314 851 | A1 | 5/1989 |
| JP | 62-88014 | A | 4/1987 |
| JP | 4-68268 | U | 6/1992 |
| JP | 7-243546 | A | 9/1995 |
| JP | 2007-211842 | A | 8/2007 |

* cited by examiner

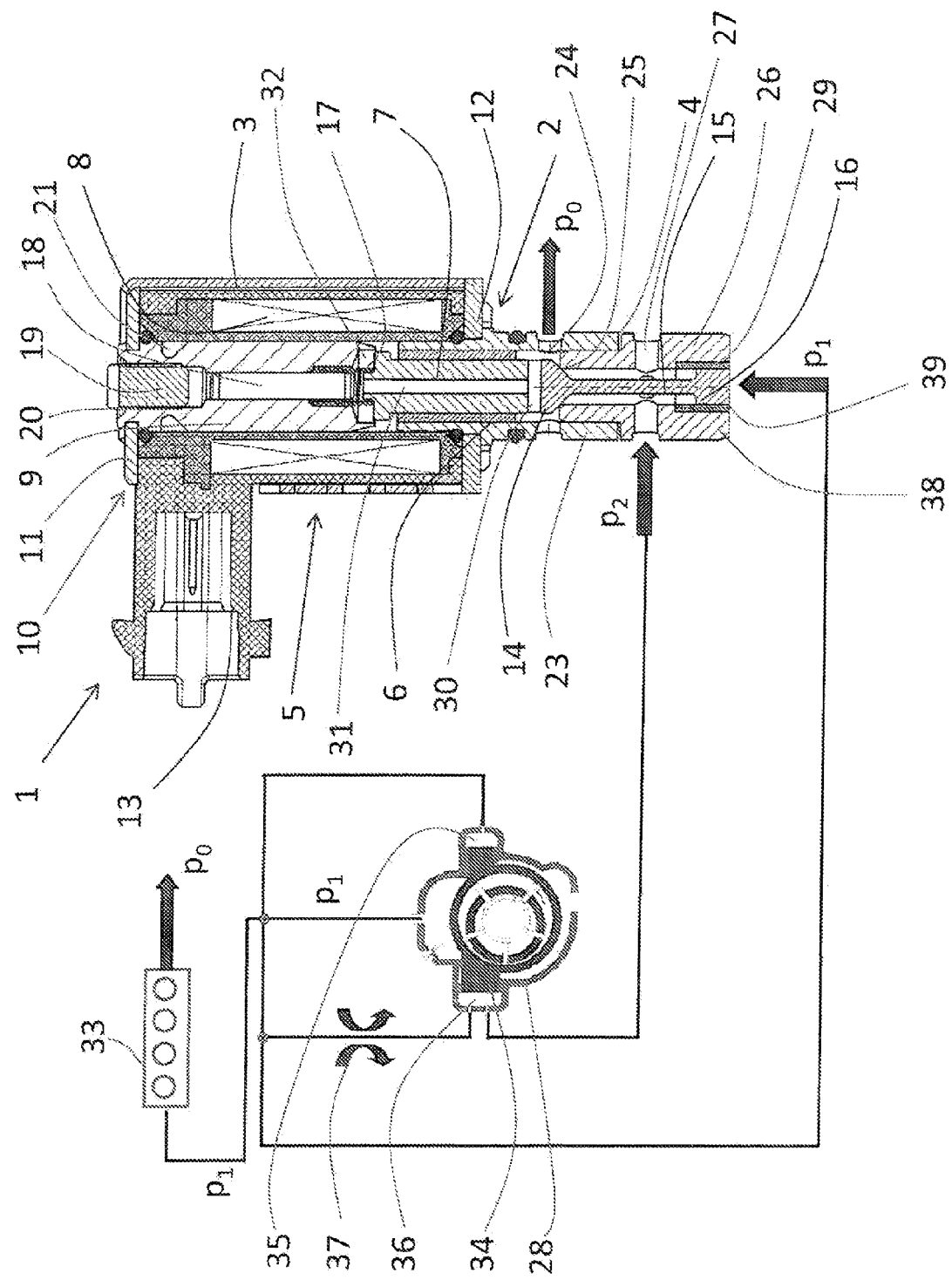

INFINITELY VARIABLE PRESSURE-CONTROL VALVE

CROSS REFERENCE TO PRIOR APPLICATIONS

This application is a U.S. National Phase application under 35 U.S.C. §371 of International Application No. PCT/EP2011/058410, filed on May 24, 2011 and which claims benefit to German Patent Application No. 10 2010 025 175.5, filed on Jun. 25, 2010. The International Application was published in German on Dec. 29, 2011 as WO 2011/160910 A1 under PCT Article 21(2).

FIELD

The present invention relates to a pressure-control valve comprising a housing accommodating a coil wound upon a coil carrier, an armature axially displaceable in a bearing, a core and a flux guiding means, and comprising a first connection bore for connection with a reservoir and a connection sleeve, the connection sleeve comprising a valve seat for a valve member of the armature.

BACKGROUND

Such pressure-control valves are used, in particular, in hydraulic actuators, in controls for automatic transmissions of motor vehicles, or in combination with a pressure or flow-rate controlled motor oil pump. These may be so-called on/off-valves or so-called modulator valves which are advantageous in that the flow rate can be controlled in an infinitely variable manner. An example of an infinitely variable pressure-control valve is described in DE 44 02 523 C2 where the armature of a pressure-control valve, known per se and operating according to the principle of proportionality, cooperates with a valve member which, put simply, is adapted to open and close a connection between a consumer port and a tank. The connection bore to the tank and the connection to the consumer are formed in a connection sleeve. In order to further enhance the damping properties of such a pressure-control valve, a branch includes a buffer damping means. Such a pressure-control valve is very complex and therefore expensive to manufacture and to assemble. The infinitely variable control is also exclusively effected through the electromagnetic drive which also requires high efforts with regard to control technology.

SUMMARY

An aspect of the present invention is to provide a pressure-control valve that is infinitely variable while requiring a low effort with regard to control, and which at the same time exhibits good damping properties. An additional aspect of the present invention is to provide a pressure-control valve which can be manufactured as economically and as simply as possible.

In an embodiment, the present invention provides a pressure-control valve which includes a housing, a coil carrier, a coil wound on the coil carrier, a first bearing, an armature comprising a valve member. The armature is configured to be axially displaced in the first bearing. A core. A flux guiding device. A connection sleeve comprises a valve seat for the valve member. A first connection bore is configured to be connected with a tank and with the connection sleeve. A second connection bore is configured to be connected with a consumer. An end of the connection sleeve distant from the core comprises a control bore with a control member supported therein. The armature and the control member are configured to be in a force-transmitting operative connection at least in an opening direction of the pressure-control valve. It is thereby possible to control, for example, the delivery rate or the oil pressure of a motor oil pump in a simple manner. For this purpose, for example, the first connection bore should be connected to a tank and the second connection bore should be connected to the consumer to be controlled. The control pressure prevails at the control member, the pressure and the magnetic force together acting against the spring force, both with regard to their direction and the sum of forces. In this manner, a simple oil pressure control of the consumer is provided, with the control member additionally being adapted to be used as an integrated damping means.

BRIEF DESCRIPTION OF THE DRAWINGS

The present invention is described in greater detail below on the basis of embodiments and of the drawing in which:

FIG. 1 illustrates a sectional view of an embodiment of a pressure control valve of the present invention, with the integration into an oil circuit being shown schematically for clarification of operation.

DETAILED DESCRIPTION

In an embodiment of the present invention, the housing can, for example, be built from a upper part and a lower part, wherein the lower part comprises the connection sleeve and the connection bores and is arranged in the upper part of the housing either positively or non-positively, wherein a bearing bush for the armature is provided in the portion of the lower part facing to the core and a bearing bushing for the control member is provided in the control bore of the connection bore. In this manner, a pressure-control valve that is particularly simple to produce and to assemble is provided.

By designing the control member as a piston element, it becomes possible to seal the connection to the consumer in a simple manner against the connection to the controlled variable. The fact that the valve member is cone-shaped provides for a tight, linear abutment of the valve member and the valve seat when the valve is in the closed state. A pressure-control valve that is particularly simple to assemble is realized by providing the armature and the control member as an integral structure, wherein the valve member and the control member are connected by a connection body of reduced diameter that is configured as a connection rod. The difference between the diameter of the bore of the valve seat and the diameter of the connection rod determines the flow area in front of the valve seat, with the forces from the control pressure acting on the valve seat and on the control member being in equilibrium in the closed state.

The interior can be supplied with atmospheric pressure in a simple manner by forming the first connection bore above the valve seat and by forming the second connection bore between the valve member and the control member. When the bearing bush for the armature is offset backward with respect to the first connection bore, an unimpeded flow is obtained between a consumer and the tank. The risk of oil leakage to the environment or the risk of a damage to the electromagnetic drive caused by pressure variations is very low due to the fact that the armature has a transversal groove, if it is a separate armature, or a transversal bore, in case of an integral control member/armature structure, and a longitudinal bore, such that atmospheric pressure prevails in the interior of the pressure-control valve above the armature.

In an embodiment of the present invention, the lower part can, for example, be bipartite, with the first part supporting the armature and having the first connection bore formed therein, and the second part being formed with the valve seat and the second connection bore as well as the connection sleeve with the control member. Due to the fact that the penetration depth of the second part into the first part is adjustable, such that the stroke of the armature is adjustable, a fine adjustment of the pressure-control valve is possible during assembly. This is possible in a particular manner, when the second part is pressed into the first part.

The core can further comprise a pin of non-magnetizable material that serves as a stop element for the armature and as a spring seat of a spring that resiliently supports the armature with respect to the core.

Further fine adjustment is made possible by the fact that the pin is arranged in the core in an adjustable manner.

The path of the magnetic field lines can be influenced by the fact that the end of the core averted from the armature has an adjustment bore in which an adjustment screw is provided. It is particularly advantageous here if the core has a substantially circumferential recess in the region of the adjustment bore on the side facing to the coil.

The following is a detailed description of the present invention with reference to an embodiment and to the accompanying drawing.

The pressure-control valve 1 comprises a housing 2 which is built substantially from an upper part 3 and a lower part 4. The upper part 3 comprises an electromagnetic drive unit 5 acting upon an armature 7 arranged for axial displacement in a bearing/bearing bush 6. The electromagnetic drive unit 5 substantially comprises a coil 8, a core 9 and a flux guiding means 10 that is formed by a backiron 11 and a yoke 12. The housing 2, which is made of a plastic material, further comprises a plug 13 for connection with a control module known per se and not illustrated herein. The electromagnetic drive unit 5 acts on the armature 7 which has a valve member 14 at its end averted from the core 9. In the present instance, the valve member 14 is connected with a control member 16 via a connection rod/valve rod 15 and is of conical shape so as to provide a linear abutment. In the present instance, the armature 7, the valve member 14, the connection rod 15 and the control member 16 are integral. A spring 17 biases the armature 7 to a closed position with respect to the core 9. The spring 17 is guided by a pin 18 adapted to be arranged in an adjustable manner in the core 9 during assembly. At the same time, the pin 18 serves as an upper stop element for the armature 7. Further, an adjustment screw 19 is provided that is arranged in an adjustment bore 20 and which allows for a fine adjustment of the electromagnetic drive unit 5 such that the path of the magnetic field lines can be influenced. In order to influence the number of magnetic field lines in the transition region to the armature 7 in a simple manner, a recess 21 is additionally provided to prevent a scattering of the magnetic field lines in the region of the adjustment screw 19 and thereby allow a linear fine adjustment during assembly.

In the shown embodiment, the lower part 4 is of bipartite structure, wherein, in the first part 23, the bearing bush 6 for the armature 7 is offset backward with respect to a connection bore 24. The term connection bore can also include a series of bores in the lower part 4. The connection bore 24 leads to a non-illustrated tank in which atmospheric pressure $p_0$ prevails. A valve seat 25 is provided below the connection bore 24 which cooperates with the valve member 14. Instead of giving the valve member 14 a conical shape, the valve seat 25 may be given a corresponding shape. By the fact that the bearing 6 for the armature 7 is provided in the first part 23 of the lower part 4 in a manner offset rearward with respect to the connection bore 24, an unimpeded flow is provided when the pressure-control valve 1 is opened to the tank. In the present instance, the valve seat 25 is formed by the second part 26 of the lower part 4, which also comprises the connection sleeve 38. The second part 26 is pressed into the first part 23, whereby the stroke of the armature 7 becomes adjustable during assembly. The second part 26 further comprises a second connection bore 27 which, in the present instance, is connected with a consumer 28. The control pressure $p_2$ of the consumer 28, which may, for example, be a variable oil pump or a vane cell pump configured to be variable, prevails at the second connection bore. A control bore 39 is provided in the connection sleeve 38, which includes a second bearing bush 29 in which the control member 16 is supported with low friction, the control member 16 being designed as a piston in the present case. As schematically illustrated in FIG. 1, the control pressure $p_1$ prevails at this control member 16, which pressure represents the motor oil pressure in the present instance.

In the shown embodiment, the armature further has a transversal bore 30 and a longitudinal bore 31 that provide a connection between the interior 32 and atmospheric pressure $p_0$. In particular, this substantially increases safety with respect to unintentional oil leakage from the pressure-control valve 1 to the environment. The electromagnetic drive 5 is furthermore not subjected to different pressures, whereby a precise control of the armature 7 is provided.

The resulting forces that result from the presence of the control pressure $p_2$ at the control member 16 and the valve member 14, when the pressure-control valve 1 is closed, are compensated for by the special design of the valve rod 15 connecting the valve member 14 with the control member 16.

The pressure-control valve 1 of the present invention operates as follows. In the present case, a motor oil pump 28, known per se, is to be controlled, which pump is designed as a variable vane cell pump. The vane cell pump 28 conveys the motor oil to the motor 33, the excess oil being returned to the tank at atmospheric pressure $p_0$. The motor oil conveyed is at a pressure $p_1$. A maximum delivery volume is achieved at maximum eccentricity of the rotary axis of the vane cell pump 28, the eccentricity being obtained by displacement of a slide 34 in the vane cell pump 28. A minimum delivery volume is achieved when the rotary axis is centric. The slide 34 cooperates with a first control chamber 35 and a second control chamber 36, with the pressure $p_2$ prevailing in both the first and second control chambers 35, 36. The abutment surface of the slide 34 is, however, larger in the second control chamber 36 so that, when the pressure-control valve 1 is de-energized, the slide 34 causes maximum eccentricity and thus the greatest delivery volume (fail safe function). If a reduction in eccentricity and thus a reduction in delivery volume of the vane cell pump 28 are desired, the pressure-control valve 1 is actuated and the pressure in the control chamber 36 is appropriately reduced. The oil with the pressure $p_2$ is thus present at the second connection bore 27. When an increase in delivery volume is desired, the pressure-control valve 1 can be closed; a nozzle 37 and the different surface ratio of the abutment surfaces of the slide 34 thus provide that a fast displacement of the rotary axis of the vane cell pump 28 into the eccentric position takes place. The motor oil pressure $p_1$ prevails at the control member 16, whereby, in case it should be too high, the motor oil pressure is controlled even when the pressure-control valve 1 is not active. The pressure-control valve 1 is further used to discharge leakage oil which, due to leaks and movement gaps, occurs in the case of large delivery volumes.

The present invention is not limited to embodiments described herein; reference should be had to the appended claims.

What is claimed is:

1. A pressure-control valve comprising:
a housing;
a coil carrier;
a coil wound on the coil carrier;
a first bearing;
an armature comprising a valve member, the armature being configured to be axially displaced in the first bearing;
a core;
a flux guiding device;
a connection sleeve comprising a valve seat for the valve member;
a first connection bore configured to be connected with a tank and with the connection sleeve; and
a second connection bore configured to be connected with a consumer;
wherein,
an end of the connection sleeve distant from the core comprises a control bore with a control member supported therein, and
the armature and the control member are configured to be in a force-transmitting operative connection at least in an opening direction of the pressure-control valve,
wherein,
an oil from the consumer acts on the control member at an oil pressure, and
an oil from the consumer acts on the second connection bore at a control pressure.

2. The pressure-control valve as recited in claim 1, wherein,
the housing comprises a lower housing part and an upper housing part,
the lower housing part comprises the connection sleeve, the first connection bore, and the second connection bore,
the lower housing part being arranged in an interlocking manner or in a force-fitting manner in the upper housing part,
a portion of the lower housing part facing the core comprises the first bearing for the armature, and
the control bore of the connection sleeve comprises a second bearing for the control member.

3. The pressure-control valve as recited in claim 2, wherein,
the lower housing part is provided as a bipartite structure comprising a first part and a second part,
the armature is arranged in the first part,
the first part is provided with the first connection bore, and the second housing part is formed with the valve seat, the second connection bore, the connection sleeve and the control member.

4. The pressure-control valve as recited in claim 3, wherein the second part has a penetration depth into the first part, the penetration depth being configured so that a stroke of the armature is adjustable.

5. The pressure-control valve as recited in claim 4, wherein the second part is pressed into the first part.

6. The pressure-control valve as recited in claim 1, wherein the control member is a piston unit.

7. The pressure-control valve as recited in claim 1, wherein the valve member has a conical shape.

8. The pressure-control valve as recited in claim 1, further comprising a connection body having a reduced diameter, wherein, the armature and the control member are formed integrally, the valve member and the control member are connected via the connection body, and the connection body is provided as a connection rod.

9. The pressure-control valve as recited in claim 8, wherein,
the first connection bore is arranged above the valve seat, and
the second connection bore is arranged between the valve member and the control member.

10. The pressure-control valve as recited in claim 1, wherein the first bearing is arranged offset rearward with respect to the first connection bore.

11. The pressure-control valve as recited in claim 1, wherein the armature further comprises a transversal groove, a transversal bore, and a longitudinal bore, the transversal groove, the transversal bore and the longitudinal bore being configured so that an atmospheric pressure prevails in an interior of the pressure-control valve above the armature.

12. The pressure-control valve as recited in claim 1, further comprising a spring configured to resiliently support the armature with respect to the core, wherein the core comprises a pin of a non-magnetizable material, the pin being configured to serve as an abutment element for the armature and as a spring seat for the spring.

13. The pressure-control valve as recited in claim 12, wherein the pin is adjustably arranged in the core.

14. The pressure-control valve as recited in claim 1, wherein the core comprises an adjustment bore comprising an adjustment screw arranged in an end facing away from the armature, the adjustment screw being arranged so as to influence a course of magnetic field lines.

15. The pressure-control valve as recited in claim 14, wherein the core comprises a substantially circumferential recess in a region of the adjustment bore on a side facing the coil.

* * * * *